May 18, 1948.  O. A. CARNAHAN  2,441,797
FLUID PRESSURE MECHANISM
Filed July 9, 1943   4 Sheets-Sheet 1

Inventor
O. A. CARNAHAN,

Patented May 18, 1948

2,441,797

UNITED STATES PATENT OFFICE 2,441,797

FLUID PRESSURE MECHANISM

Orson A. Carnahan, Syracuse, N. Y.

Application July 9, 1943, Serial No. 494,109

9 Claims. (Cl. 103—174)

1

This invention relates to fluid pressure mechanisms and has more particular relation to expansion chamber pumps or motors with mechanically operated valves.

In the past it has been customary in hydraulic mechanisms which are used either as pumps or motors to use some type of anti-friction bearings to carry the reaction loads resulting from piston thrust, and to depend on very accurate workmanship to insure proper valve timing in order to prevent excessive pressure near the ends of the piston or plunger strokes.

Many different types of constructions have been used for the purpose of carrying the excessive loads due to high pressures but all of the prior constructions have resulted in very heavy and cumbersome machines. In many other constructions parts have failed due to violent peak pressures which are caused by inaccurate valve timing. Inaccuracy of valve timing has been a result largely of the difficulty in securing precision in machining of parts and in the maintenance of the parts in proper relation due to continual wear.

An object of the invention is to provide a mechanism in which the piston forces are balanced to relieve the main crank shaft bearings of thrust loads.

Another object of the invention is to provide improved mechanically operated balanced valves so as to still further reduce the forces that otherwise could be imposed on the crank shaft.

A further object of the invention is to provide a valve mechanism that will prevent excessive peak pressures at the ends of the piston strokes even despite slightly inaccurate valve timing due to minute inaccuracy in the machined parts, or due to the wear of the valve elements.

A still further object of the invention is to provide an extremely light-weight hydraulic unit of rugged construction and of unusual durability, capable of operating continuously at high speed and pressures without danger of bearing failure.

The various features of the invention can best be understood by reference to the accompanying drawings when viewed in light of the particular description that is to follow. In the drawings.

Figure 1:
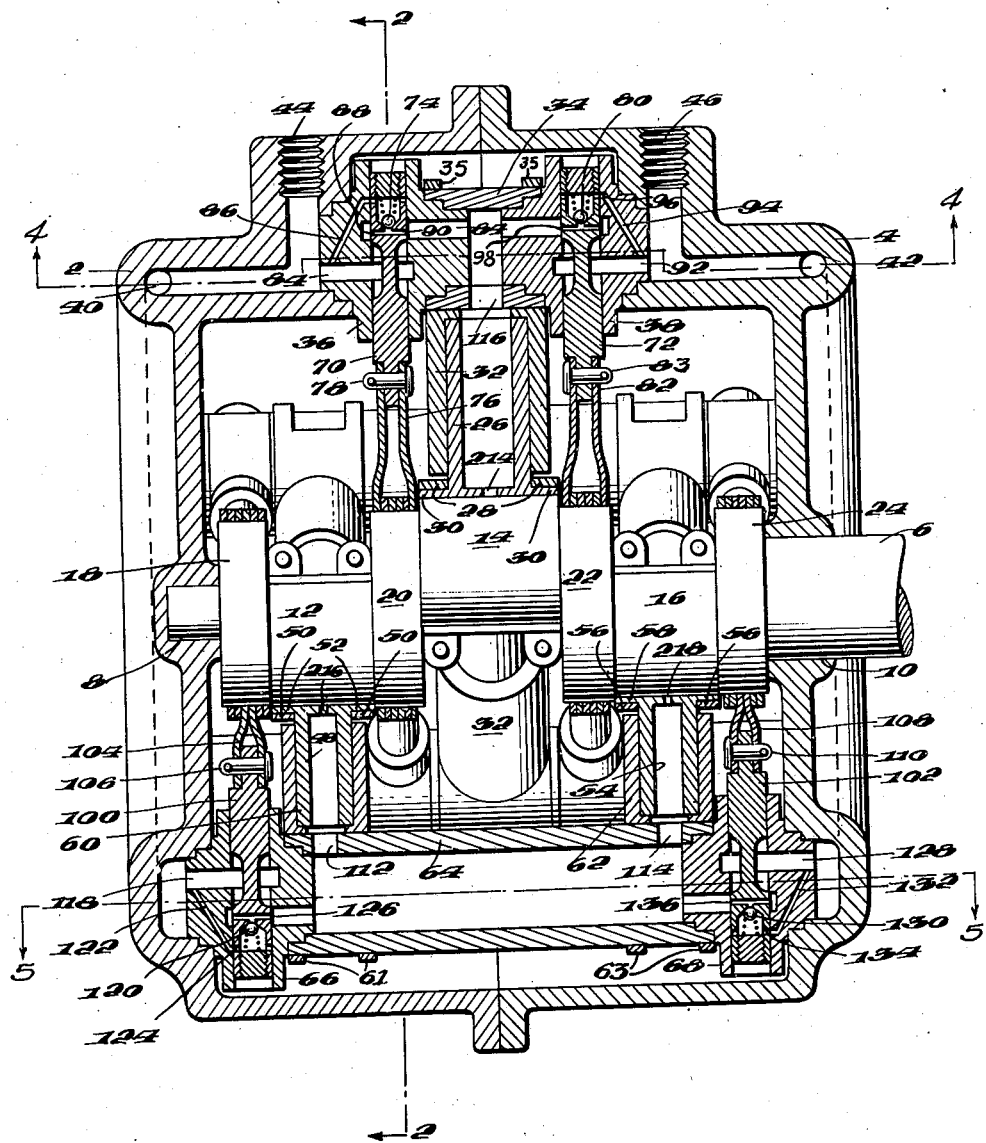
Figure 1 is a cross sectional view of the pump or motor assembly taken along line 1—1 of Figure 2.

In the preferred embodiment of the invention the pump or motor mechanism is sealed in a housing composed of two sections indicated by reference numerals 2 and 4 which are held together in a conventional manner, as by bolts. The mechanism within the housing includes a crank shaft 6 supported by main bearings 8 and 10 centrally located with respect to the casing. The crank shaft 6 includes three crank pins 12, 14, and 16. Forming a part of the crank shaft 6 and being located within the housing are four eccentrics 18, 20, 22, and 24.

Three large plungers 26 are arranged about the large center pin 14 in a plane perpendicular to the axis of the crank shaft and in equally spaced relation with respect to each other. The plungers 26 are held against the center pin 14 by means of two sectional rings 28 having three sections each and which bear upon flanges 30 extending from the wall of the plungers at the base of each thereof. Each of the plungers reciprocates in a cylinder 32 which in turn is mounted for oscillation on a cylinder head 34 by means of bands 35 extending from the outer ends of the cylinders 32 into bearing contact with the cylinder head 34.

The three cylinder heads 34 together with cooperating valve chests 36 and 38 are held in symmetrically spaced relationship about the crank shaft 6 by housing sections 2 and 4, forming a tightly sealed assembly. Obviously gaskets and packings may be used for effecting tight seals wherever required throughout the assembly.

As shown in Figure 1 of the drawing, the housing sections 2 and 4 are provided with passageways 40 and 42, respectively. These passageways are formed within the periphery of the respective sections 2 and 4 and they communicate with each of the cylinder heads 34 and valve chests 36 and 38 to form a continuous passage between their respective peripheral portions 40 and 42. The passages 40 and 42 are provided with external connecting means 44 and 46 whereby fluid may enter and be discharged from the fluid pressure mechanism. The valves operating to control the motor are of identical construction and their description will follow hereinafter.

A set of three small plungers 48 each having one-half the area of one of the plungers 26 are held to the crank pin 12 by sectional rings 50 which bear against flanges 52 extending from the wall of the plungers 48. A similar set of three small plungers 54 also having one-half the area of the plungers 26 are held to the crank pins 16 by sectional rings 56 which bear against outwardly extending flanges 58 at the base of the plungers. A plunger and its cooperating cylinder may be referred to herein as a plunger-cylinder combination, and a plurality of such plunger-cylinder combinations attached to any given crank pin may be designated herein as an aggregate.

Plungers 48 reciprocate in cylinders 60 and the plungers 54 reciprocate in cylinders 62 and the sets of cylinders 60 and 62 are mounted for oscillation on a cylinder head 64 extending at right angles thereto. The mounting means consists of bands 61 and 63 respectively which extend from the outer ends of the cylinders into bearing contact with the cylinder head 64. The cylinder heads 64 and valve chests 66 and 68 are held in symmetrically spaced relationship relative to the crank shaft 6 and diametrically opposed to cylinder heads 34 by the housing sections 2 and 4, tightly sealed assemblies being formed thereby between passages 40 and 42.

It will be observed from an examination of Figure 1 that the two valve chests 36 and 38 are associated with each of the large cylinders 32 and that the two valve chests 66 and 68 are associated with each pair of smaller cylinders 60 and 62. To control the flow of fluid through each of the valve chests 36 and 38, valve assemblies 70 and 72 are provided. The valve assemblies 70 and 72 are operated by the eccentrics 20 and 22 which rotate with the crank shaft 6. The valve chest 36 is provided with the reciprocating valve 70 which, in turn, includes an auxiliary valve 74, both valves together reciprocating in a bore provided within the valve chest. The valve 70 and its auxiliary valve 74 are reciprocated by the motion of the eccentric 20 transmitted through the eccentric strap 76 and the hinge pin 78.

In a similar manner the valve 72 in the valve chest 38 is provided with an auxiliary valve 80, both of which reciprocate in a bore provided in the valve chest. The valve 72 and its auxiliary valve 80 are reciprocated by the motion of the eccentric 22 transmitted through the eccentric strap 82 and a hinge pin 83.

Operation of the valve 70, the auxiliary valve 74, the valve 72, and the auxiliary valve 80 control the flow of fluid into and out of the cylinder 32 during the reciprocation of the plungers 26 as will be more fully explained hereinafter.

The valve body 36 is provided with passages 84 communicating with opposite sides of the valve 70. A bleed passage 86 communicating with one of the passages 84 extends into the outer end of the valve body 36 for communication with a port 88 within the auxiliary valve 74. The auxiliary valve 74 also includes ports 90 communicating with the inner passage 84.

The valve body 38 has passages 92 extending from opposite sides thereof providing for the flow of fluid through the valve 72. The valve body 38 also includes a bleed passage 94 communicating with an inner port 96 in the auxiliary valve 80, the auxiliary valve having a port 98 communicating with one of the main valve ports 92.

Each of the valve assemblies 66 and 68 that cooperate with the cylinder head 64 is provided with valve mechanisms 100 and 102, respectively. The valve 100 is reciprocated within the valve body 66 through a strap 104 and a hinge pin 106, the strap 104 encircling the eccentric 18 and receiving its driving force therefrom.

The valve 102 receives its reciprocating motion from the crank shaft eccentric 24 through the connecting strap 108 and the hinge pin 110. The valves 100 and 102 control the flow of fluid to and from the cylinders 60 and 62 by way of the cylinder head 64 and cylinder ports 112 and 114, respectively. The valves 70 and 72 control the flow of fluid to and from the cylinder 32 by way of cylinder port 116.

The valve body 66 includes a passage 118 extending across the valve providing a communication between the duct 40 and the cylinder head 64. The outer portion of the passage 118 is in communication with an auxiliary valve 120 by means of bleed port 122 and auxiliary valve port 124. The inner end of the auxiliary valve 120 is provided with passage 126.

In similar fashion the valve 68 has formed therein a fluid passage 128 affording communication between the cylinder head 64 and the annular duct 42. The valve 102 operating in the valve body 68 includes an auxiliary valve 130 which communicates with the main valve passage 128 by way of a bleed port 132 and passage 134 at the outer end of the auxiliary valve. The inner end of the auxiliary valve is provided with passage 136.

Figure 3:
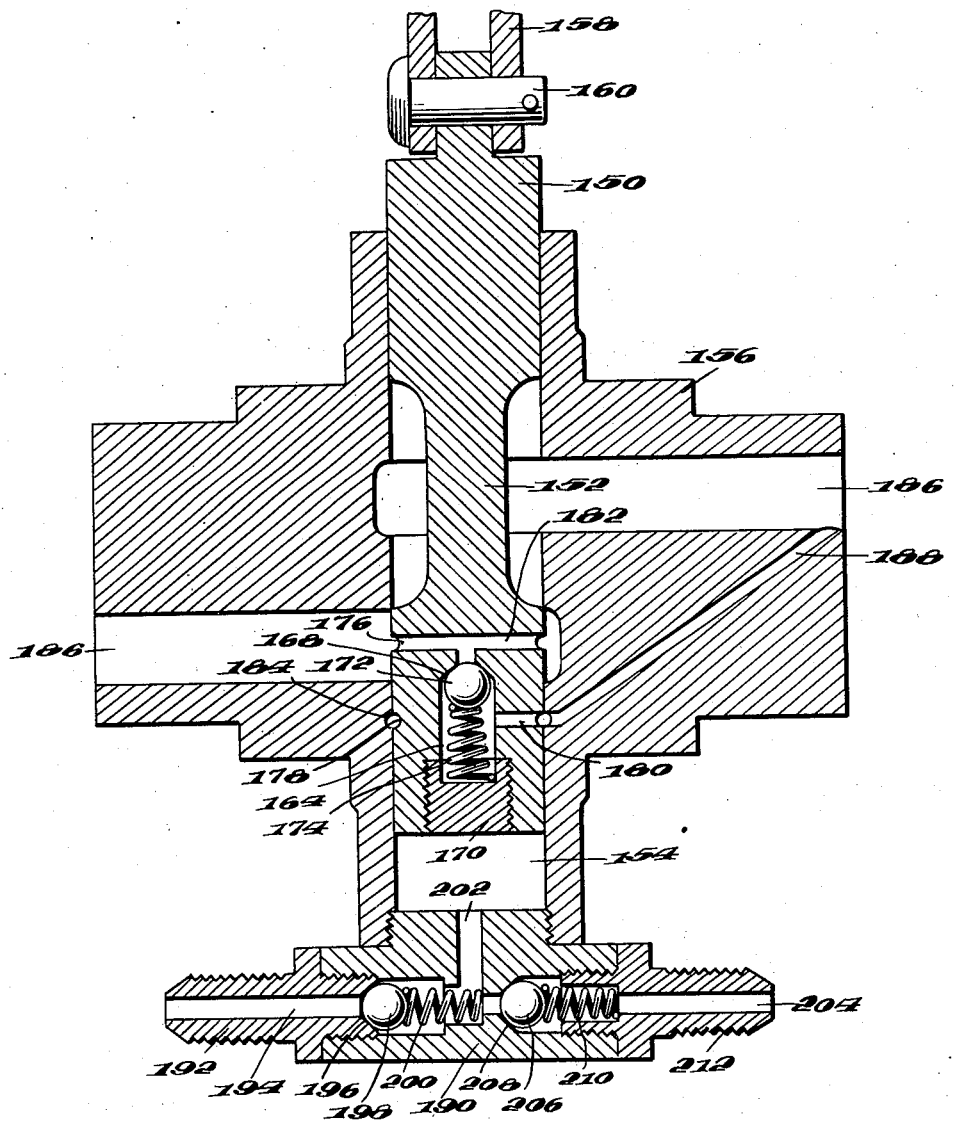
Figure 3 is an enlarged cross sectional view of a single valve assembly modified to include an auxiliary low pressure pump.
Figure 4:
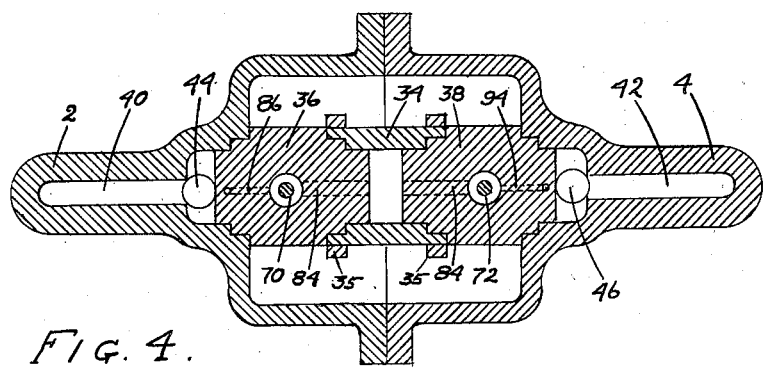
Figure 4 is a cross-sectional view taken on line 4—4 of Figure 1.
Figure 5:
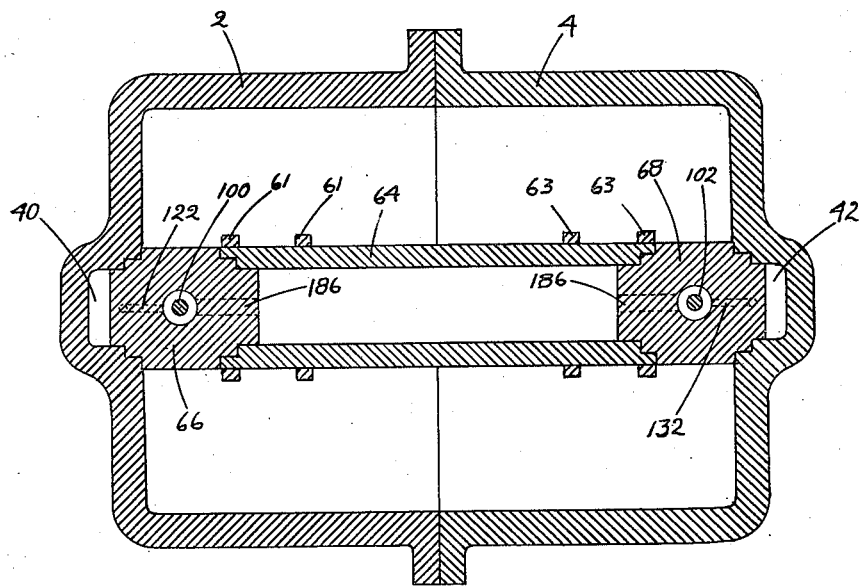
Figure 5 is a cross sectional view taken on line 5—5 of Figure 1.

The general construction of the valves throughout the assembly is substantially identical and a full understanding of the construction can be secured by referring to Figure 3 of the drawing wherein a slightly modified form of the valve construction is illustrated. In Figure 3 of the drawing the valve comprises a cylindrical member 150 having a reduced section 152 in its central portion which operates within the bore 154 provided in the valve chest 156. One end of the cylindrical member 150 is connected to an eccentric strap 158 by a removable hinge pin 160 which serves as a connection between the eccentric strap 158 and the valve member 150. The cylindrical valve member 150 is provided with a cavity 164, the inner end of which is provided with a valve seat 168. The cavity 164 is closed at its outer end by a plug 170 forming a closure therefor and constituting an auxiliary valve mechanism operable through a ball valve 172. The ball valve 172 is provided within the cavity 164 and is biased against the valve seat 168 by valve spring 174. In the embodiment shown in Figure 3 of the drawing the valve 172 comprises a ball closure which is biased against the valve seat 168 by a coil compression spring 174 although it is contemplated that other types of valve may be employed within the scope of the invention.

The valve member 150 has formed therein peripheral grooves 176 and 178 located within the area of the auxiliary valve body. The groove 178 communicates with the interior of cavity 164 by way of a passage 180 and, as shown in Figure 3, this groove is positioned adjacent the end of the cylindrical valve member 150. The groove 176 communicates with the interior of the cavity 164 by way of a passage 182, valve seat 168, and the spring pressed ball closure 172. When the valve ball 172 is seated on the valve seat 168 under tension of the spring 174, the passage 182 between groove 176 and cavity 164 is closed. As shown in Figure 3, the groove 176 is positioned intermediate the groove 178 and the reduced portion 152 of the reciprocating valve member 150. In order to facilitate the flow of fluid into the valve cavity 164 by way of the passage 180, the valve body 156 is provided with a groove 184 adapted to register with the peripheral groove 178 in the auxiliary valve.

The valve body 156 includes ports 186 extending through the valve by way of the reduced body 152 of the reciprocating valve member 150. The passage 186 is in communication with the auxiliary valve cavity 164 by way of a bleed port 188.

Insofar as described, the valve assembly shown in Figure 3 corresponds to those more generally shown in Figure 1 of the drawings. In the construction illustrated in Figure 3 there is also included an auxiliary valve chest assembly that may be used in conjunction with one or more of the regular valve assemblies whenever an auxiliary low pressure pump is required. For example, the intake and discharge fittings thereof may be connected with suitable ports in the main casing, adapting the auxiliary pump to sump drainage or pump priming purposes. The auxiliary low pressure valve assembly consists of a valve chest 190 which forms a closure for the outer end of the bore 154 in the main valve body 156. The valve chest 190 is provided with an intake fitting 192 having an intake passage 194 and a valve seat 196. An intake valve 198 is biased against the valve seat 196 by a valve spring 200. The auxiliary valve chest 190 also has a passage 202 connecting the intake passage 194 with the chamber formed at the end of the valve body 156 by reason of the auxiliary valve 190. The auxiliary valve chest 190 includes a discharge passage 204 controlled by a discharge valve 206 that is pressed against its valve seat 208 under the pressure of the valve spring 210. The discharge passage 204 has a discharge fitting 212 for connection with an exit line.

In my application for patent Serial No. 302,587, filed November 2, 1939, now Patent No. 2,347,663, of which this application is a continuation-in-part, I have disclosed and claimed a fluid pressure bearing of which certain features have been embodied in this invention. In that application I have disclosed a bearing structure consisting of a cylinder, a slidable plunger in telescopic assembly with the cylinder, a bearing surface at one end of the plunger in mating contact with a supporting surface. In that application the head on one end of the plunger bears a relation to the area of the bearing surface so that fluid under pressure passing through a passage between the plunger head and the bearing surface is transmitted to the mating bearing surfaces to maintain a film of fluid therebetween that remains constant for whatever variation may occur in the load imposed on the mechanism.

In the present instance the plungers throughout the pump have been constructed in accordance with the teaching of my prior application and in accordance therewith the plunger 26 has a passage 214 in the base thereof for admitting fluid under pressure to the inner surface thereof thereby providing a lubricating and supporting film between the plunger and the crank bearing. In similar fashion the plungers 48 and 54 are provided with passages 216 and 218, respectively, thereby admitting fluid under pressure to the bearing surfaces between the inner faces of the plungers and the engaging surface of the crank shaft.

Figure 2:
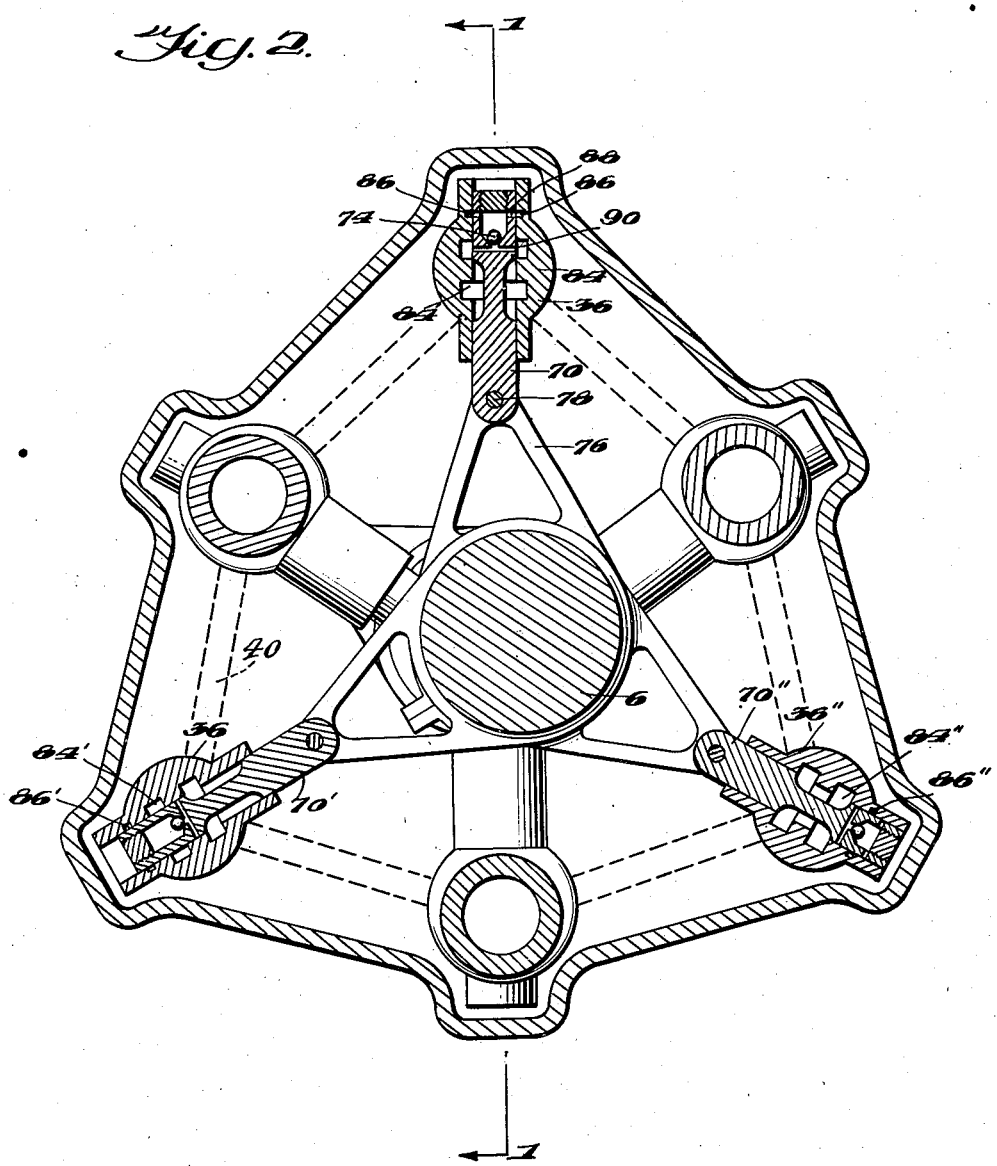
Figure 2 is a cross sectional view taken along line 2—2 of Figure 1.

The fluid pressure mechanism may be operated either as a pump or a motor and in either direction. For example, if fluid under pressure is applied at the intake connection 44 (Figure 1), the pressure will be transmitted through passages 40 to ports 118, 122, 84, and 86. By reference to Figure 2, it will be seen that port 84 is closed by the valve 70, port 86 is open through valve ports 88 and 90, but valve port 88 is closed against flow into the cylinder 32 by the auxiliary valve 74. Since all of the valves of each set of three are operated from the same crank shaft eccentric, it will be obvious that their position will be changed in timed relation with respect to each other and in this regard it is to be noted that ports 84' and 86' in the second valve of the group of three are both closed by valve 70', but that the port 84" in the third valve of the group is open to its corresponding cylinder. The high pressure liquid entering through port 84" to its corresponding cylinder causes a rotation of the crank shaft 6 in a counter-clockwise direction.

Reverting again to the valve system illustrated in Figure 1 of the drawing, as the crank shaft rotates, the motor action of the cylinders and valves shown in cross section in that figure is as follows: Plungers 48, 26, and 54 start out of their respective cylinders thereby tending to produce a vacuum in the cylinders 60, 32, and 62. The rotary motion of the crank shaft 6 is communicated to all valves through the action of the eccentrics 18, 20, 22, and 24, the corresponding straps 104, 76, 82, and 108, and the hinge pins 106, 78, 83, and 110. The valve motion produced through these instrumentalities is effective first to close the auxiliary ports 94 and 132 and then to open the main ports 118 and 84. The high pressure fluid entering through port 118, cylinder head passages 112 and 114 acts on plungers 48 and 54, and crank pins 12 and 16. The forces on plunger 48 and 54 are transmitted to the crank pins 12 and 16 through the supporting lubricating films as herein described. At the same time high pressure fluid entering through port 84 and cylinder head passage 116 acts on the larger plunger 26 and its crank pin 14. The force on plunger 26 is similarly transmitted to crank pin 14 by the supporting lubricating film between the respective surfaces. Since the force acting on the crank pin 14 is equal to the sum of the forces acting on crank pins 12 and 16, there is no component to be carried by the main bearings 8 and 10.

Near the end of the stroke, valves 100 and 70 close ports 118 and 84, again forming a vacuum in cylinders 48, 26, and 54. Valves 72 and 102 next open ports 94 and 132 just before the end of the stroke. At the beginning of the return or discharge stroke any excess pressure will be relieved through the auxiliary valves 80 and 130, the valves 120 and 74 being inoperative due to the check valve action. Just after the beginning of the return stroke, valves 100 and 70 close the auxiliary valve ports 122 and 86 which in no way affects the action as a motor.

Valves 72 and 102 next open main ports 92 and 128 for free discharge through passage 42 and connection 46. Near the end of the discharge stroke valves 72 and 102 close main ports 92 and 128 and the remaining discharge is through auxiliary valves 80 and 130. Valves 100 and 70 open ports 122 and 86 just before the end of the stroke which again in no way affects the action as a motor when running in this direction.

It will be noted that all forces are balanced in this mechanism and that the only loads on the main bearings 8 and 10 are those due to the weight of the parts, the inertia of the valve mechanism and the friction resistance. Due to this unique valve mechanism, a slight inaccuracy in valve timing cannot result in excessive peak pressures near the ends of the strokes or in a loss of pressure due to both intake and discharge valves being open at the same time. It will also be noted that the power strokes of the multiple cylinder mechanism give a continuous torque which varies slightly in magnitude much like a multiple cylinder gas or steam engine. By increasing the number of cylinders, the torque may be made even more uniform.

Assuming the crank shaft 6 is rotated in a clockwise direction, the mechanism functions as a pump and the action of the cylinders and valves shown in cross section in Figure 1 is as follows: As the plungers 48, 26, and 54 start on their suction strokes with main ports 118, 84, 92, and 128 all closed and with auxiliary ports 124, 88, 96, and 134 open except for the auxiliary valves 120, 74, 80, and 130, which prevent fluid from entering the cylinders 48, 26, and 54, a vacuum will be formed at the beginning of the stroke. Valves 100 and 70 first close ports 124 and 88. Then valves 72 and 102 open the main ports 92 and 128 permitting fluid to enter through connection 46, passage 42, ports 92 and 128, cylinder head openings 112, 114, and 116. Valves 72 and 102 close the main ports 92 and 128 cutting off admission to cylinders 48, 26, and 54, so that a vacuum will be formed just before the end of the stroke. Valves 100 and 70 next open auxiliary ports 124 and 88 to passages 122 and 86 which are inoperative for the remainder of the stroke due to the auxiliary valves 120 and 74. On the return or discharge stroke, the vacuum is first relieved and then a very small volume of fluid may be discharged to the suction side before valves 72 and 102 close the auxiliary ports 96 and 134, the discharge being through auxiliary valves 120 and 74. Valves 100 and 70 next open the main ports 118 and 84 for free discharge through ports 118 and 84, passage 40 and connection 44. Just before the end of the discharge stroke, valves 100 and 70 close the main ports 118 and 84 when discharge will be through the auxiliary valves 120 and 74, ports 122 and 86, passage 40 and connection 44. Just before the end of the stroke valves 72 and 102 open the auxiliary ports 96 and 134 allowing the last of the discharge to return to the suction side of the mechanism. The foregoing describes a complete revolution or cycle of the mechanism and it can be seen therefore that due to the overlapping of the auxiliary valve port openings, there may be a slight loss in volumetric efficiency. However, the auxiliary valves prevent the possibility of excessive peak pressures due to improper valve timing and therefore eliminate one of the serious defects in mechanisms of this kind as known heretofore.

Having now fully described the invention, what is claimed as new and that for which Letters Patent is desired is the following:

1. In combination, a crank shaft having at least three throws, at least two of said throws constituting a set being displaced 180° with respect to the remainder, a plurality of plunger and cooperating cylinder combinations constituting an aggregate corresponding to each of said throws, a manifold for each plunger-cylinder combination of each aggregate, each of said plunger-cylinder combinations being connected at one end thereof to its corresponding throw and the other end of each thereof being mounted for oscillation on its corresponding manifold whereby rotation of said crank shaft is accompanied by angular oscillation of each plunger-cylinder combination and relative reciprocation between the plunger and cylinder of each combination, passages through which fluid may enter and leave each of said cylinders, valves for controlling the flow of fluid into and out of said cylinders, said passages being connected to a header, the effective working area of the plunger-cylinder aggregates connected to a set of throws being substantially equal to the effective working area of the plunger-cylinder aggregate connected to the 180° displaced throw, and the angle of oscillation of each of said plunger-cylinder aggregates being equal to each other, thereby balancing the forces of translation.

2. In combination, a crank shaft having three throws, two of said throws constituting a set and being displaced 180° with respect to the third throw, a plurality of plunger and cooperating cylinder combinations constituting an aggregate corresponding to each of said throws, a manifold for each plunger-cylinder combination of each aggregate, each of said plunger-cylinder combinations being connected at one end thereof to its corresponding throw and the other end of each thereof being mounted for oscillation on its corresponding manifold whereby rotation of said crank shaft is accompanied by angular oscillation of each plunger-cylinder combination and relative reciprocation between the plunger and cylinder of each combination, passages through which fluid may enter and leave each of said cylinders, valves for controlling the flow of fluid into and out of said cylinders, said passages being connected to a header, the effective working area of the plunger-cylinder aggregates connected to said set of throws being substantially equal to the effective working area of the plunger-cylinder aggregate connected to the 180° displaced throw, and the angle of oscillation of each of said plunger-cylinder aggregates being equal to each other, thereby balancing the forces of translation.

3. In combination, a crank shaft having three throws, two of said throws constituting an axially aligned set, a third throw located between the throws of said set and being displaced 180° with respect to the throws of the set, a plurality of plunger and cooperating cylinder combinations constituting an aggregate corresponding to each of said throws, a manifold for each plunger-cylinder combination of each aggregate, each of said plunger-cylinder combinations being connected at one end thereof to its corresponding throw and the other end of each thereof being mounted for oscillation on its corresponding manifold whereby rotation of said crank shaft is accompanied by angular oscillation of each plunger-cylinder combination and relative reciprocation between the plunger and cylinder of each combination, passages through which fluid may enter and leave each of said cylinders, valves for controlling the flow of fluid into and out of said cylinders, said passages being connected to a header, the effective working area of the plunger-cylinder aggregates connected to said set of throws being substantially equal to the effective working area of the plunger-cylinder aggregate connected to the 180° displaced intermediate throw, and the angle of oscillation of each of said plunger-cylinder aggregates being equal to each other, thereby balancing the forces of translation.

4. In combination, a crank shaft having at least three throws, at least two of said throws constituting a set being displaced 180° with respect to the remainder, a plurality of plunger and cooperating cylinder combinations constituting an aggregate corresponding to each of said throws, a manifold for each plunger-cylinder combination of each aggregate, each of said plunger-cylinder combinations being connected at one end thereof to its corresponding throw and the other end of each thereof being mounted for oscillation on its corresponding manifold whereby rotation of said crank shaft is accompanied by angular oscillation of each of said plunger-cylinder combinations and relative reciprocation between the plunger and cylinder of each combination, passages through which fluid may enter and leave each of said cylinders, said passages being connected to a header, the effective working area of the plunger-cylinder aggregates connected to a set of throws being substantially equal to the effective working area of the plunger-cylinder aggregate connected to the 180° displaced throw, the angle of oscillation of each of said plunger-cylinder aggregates being equal to each other, thereby balancing the forces of translation, valve mechanism controlling the flow of fluid through said passage, and means interconnecting said valve mechanism and said crank shaft whereby said mechanism is positively operated when said shaft is rotated.

5. In a fluid pressure device, a crank shaft having valve actuating eccentrics, a fluid manifold disposed in spaced parallel relation with respect to said crank shaft, a piston and cylinder combination for causing the flow of fluid through said manifold, one end of said combination being attached to said crank shaft and the other end thereof being attached to said manifold, an inlet valve for controlling fluid flow into said piston-cylinder combination, a discharge valve for controlling fluid flow out of said piston-cylinder combination, a valve actuator interconnecting each of said valves and its respective eccentric, said inlet valve having a port that opens after said piston has started on its intake stroke and closure before said piston has reached the end of its intake stroke, said discharge valve having a port operative after said inlet port of said first-named valve is closed and which opens before said piston has started its discharge stroke and closes after said piston has reached the end of its discharge stroke and before said inlet port of said first-named valve opens.

6. In a fluid pressure device, a crank shaft having a throw and a valve actuating eccentric, a fluid manifold disposed in spaced parallel relation with respect to said crank shaft, a piston and cooperating cylinder, one of which is attached to said crank shaft and the other of which is attached to the manifold, a valve mechanism for controlling fluid flow through said manifold, including an inlet valve, an actuator interconnecting said valve and said eccentric, said valve having an inlet port that opens after said piston has started on its intake stroke and closes before said piston has reached the end of its intake stroke, a second valve controlling discharge from said manifold, said valve having a discharge port operative after said inlet port is closed and which opens before said piston has started its discharge stroke and closes after said piston has reached the end of its discharge stroke and before said inlet port opens, and means for operating said second valve in said sequence.

7. In a fluid pressure device, a crank shaft having a valve actuating eccentric, a fluid manifold disposed in spaced parallel relation with respect to said crank shaft, a piston and cooperating cylinder, one of which is attached to said crank shaft and the other of which is attached to the manifold, said piston and cylinder combination constituting a pump operable by said crank for causing the flow of fluid through said manifold, a reversible flow valve mechanism for controlling fluid flow through said manifold, including a valve for controlling fluid flow through one end of said manifold, an actuator interconnecting said valve and said eccentric, said valve having a port that opens after said piston has started on its intake stroke and closes before said piston has reached the end of its intake stroke, a second valve controlling fluid flow through the other end of said manifold having a port operative after said first named port is closed and which opens before said piston has started its discharge stroke and closes after said piston has reached the end of its discharge stroke and before said first named port opens, and means for operating said second valve in said sequence.

8. In a fluid pressure device, a crank shaft having a pair of valve actuating eccentrics, a fluid manifold disposed in spaced parallel relation with respect to said crank shaft, a piston and cooperating cylinder, one of which is attached to said crank shaft and the other of which is attached to the manifold, a reversible flow valve mechanism including a pair of valves for controlling fluid flow through said manifold, valve actuators interconnecting said valves and said eccentrics, each of said valves having a main port and an auxiliary port, the main ports being operative either as intake or discharge ports, the auxiliary ports being operative only as discharge ports, said valves being so arranged and operated that the main ports open after the piston has started its stroke and close before the end of the stroke, and the auxiliary ports open only after the main ports are closed and before the piston has started its discharge stroke and close after the piston has reached the end of its discharge stroke and before said main ports open.

9. In a fluid pressure device, a crank shaft having a pair of valve actuating eccentrics, a fluid manifold disposed in spaced parallel relation with respect to said crank shaft, a piston and cooperating cylinder, one of which is attached to said crank shaft and the other of which is attached to the manifold, a reversible flow valve mechanism including two valves for controlling fluid flow through said manifold, a pair of valve actuators interconnecting said valves and said eccentrics, one of said valves having an inlet port that opens after said piston has started on its intake stroke and closes before said piston has reached the end of its intake stroke, and the other of said valves having a discharge port operative after said inlet port is closed and which opens before said piston has started its discharge stroke and closes after said piston has reached the end of its discharge stroke and before said inlet port opens.

ORSON A. CARNAHAN.

REFERENCES CITED

The following references are of record in the file of this patent:

UNITED STATES PATENTS

| Number | Name | Date |
|---|---|---|
| 439,792 | Storey | Nov. 4, 1890 |
| 1,239,059 | Sundh | Sept. 4, 1917 |
| 1,416,314 | Atkins | May 16, 1922 |
| 1,557,434 | Demarest | Oct. 13, 1925 |
| 1,990,263 | Benedek | Feb. 5, 1935 |
| 2,013,478 | Read | Sept. 3, 1935 |
| 2,151,402 | Burch | Mar. 21, 1939 |
| 2,307,374 | Johnston | Jan. 5, 1943 |
| 2,347,663 | Carnahan | May 2, 1944 |

FOREIGN PATENTS

| Number | Country | Date |
|---|---|---|
| 21,119 | Norway | Feb. 6, 1911 |
| 261,984 | Great Britain | 1926 |
| 466,180 | Great Britain | May 21, 1937 |